INVENTOR
Calvin Lee Scott
BY
Wofford & Felman
ATTORNEYS

Feb. 10, 1970  C. L. SCOTT  3,494,460
PNEUMATIC CONVEYOR AND DUST SEPARATOR SYSTEMS
Filed Feb. 14, 1968  3 Sheets-Sheet 2

INVENTOR
Calvin Lee Scott
BY
Wofford & Felsman
ATTORNEYS

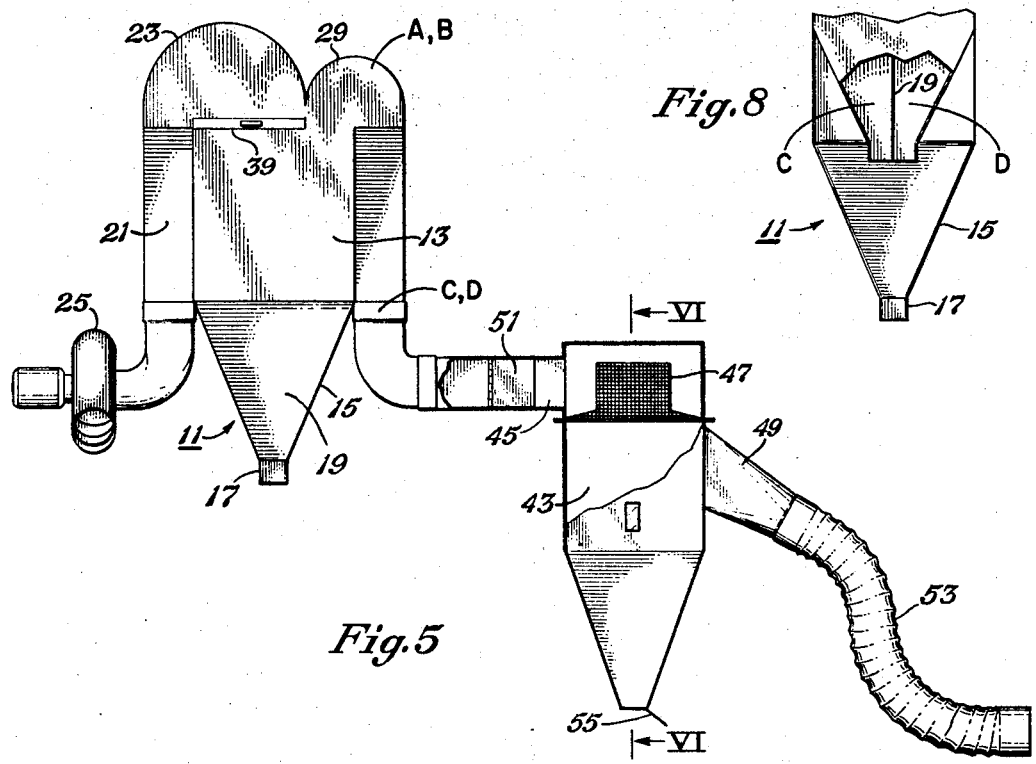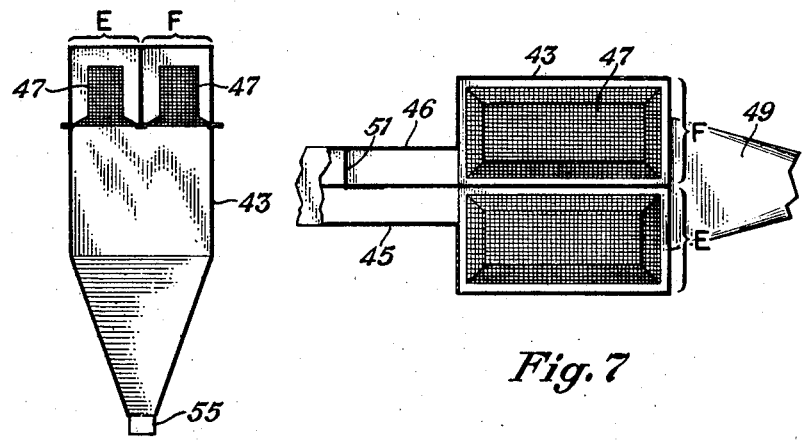

United States Patent Office 3,494,460
Patented Feb. 10, 1970

3,494,460
PNEUMATIC CONVEYOR AND DUST SEPARATOR SYSTEMS
Calvin Lee Scott, 208 E. Baron, Everman, Tex. 76140
Filed Feb. 14, 1968, Ser. No. 705,331
Int. Cl. B07b 9/00, 1/50; B01d 46/04
U.S. Cl. 209—36  6 Claims

ABSTRACT OF THE DISCLOSURE

A dust separator system having a first hopper partitioned into two compartments connected with two separate inlet flow passages. Flexible frame mounted filters, which support weighting elements, are removably secured across each compartment. A fan and a valve arrangement direct airflow alternately through the separate passages and connected compartments to intermittently interrupt airflow through the filters which have a triangular cross sectional configuration. Consequently, the weighting elements in the compartment where airflow ceases periodically move downward forcefully under the force of gravity to alternately jolt and cleanse the filters. To separate large particles, such as grain in a pneumatic conveyor system, a compartmented second hopper communicates with the inlet conduit of the first hopper and includes a screen across each compartment through which the air is alternately directed.

BACKGROUND AND GENERAL DISCUSSION

Pneumatic conveyor and dust separator systems have been previously developed for separating fine particles from air or conveying grain or other solids. Ideally, all solid particles, including "dust" (meaning the extremely fine particles), are isolated from the fans. When conveying edible products, it is especially important to isolate the dust particles from the fan and accumulate them to minimize losses. The filters used to separate dust from air become clogged in a relatively short period of time. Consequently, it is essential that the filters have means for automatically cleansing them. Otherwise, the pressure differential acrosss the filters becomes excessively large, with detrimental results due to overloading the fan power source and resulting decreases in efficiency.

A number of techniques have been employed in the past for cleansing the filters. For example, it has been suggested that the air flow through the filters be periodically reversed; or that jets of air be directed periodically across the filters; or that the filters be vibrated mechanically. All known systems for cleansing the filters have significant disadvantages which have limited their commercial success. Frequently, the salient characteristic disadvantage of such systems is a complexity which significantly increases initial cost; decreases reliability; and lowers operating efficiency.

It is my purpose to provided a pneumatic conveyor system which effectively separates both large particles and dust particles from the air through utilization of separator means which are self-cleansing and require no additional energy such as that required by reversed air flow, air jets, or vibrators.

Another of my purposes is to provide a dust separator system (which may be used as one component of a pneumatic conveyor system, or which may be used separately where dust control is required), including in separate compartments a pair of filters which alternately cleanse themselves when air flow through the compartments is alternately interrupted and thus which offers continuous operation at near maximum efficiency.

I utilize separate airflow passages into which filters are disposed and through which air flow is alternately directed by suitable fan and valve means. The filters are removably mounted by frames and include flexible, air perviious material of triangular cross section extending loosely across each separate passage. Weighting elements are secured to approximate mid-regions or apexes of the filters and the air flow through the filters alternately interrupted, causing the weighting elements to fall rapidly under the force of gravity to alternately jolt and cleanse the filters. Other, and more specific, features of my invention will become apparent in the following detailed description.

BRIEF DESCRIPTION OF THE FIGURES OF THE DRAWINGS

FIG. 5 is a side elevation view in fragmentary section of a dust separator assembled as one component of a pneumatic conveyor which includes large particle screen means and a flexible inlet hose; FIG. 6 is a sectional view as seen looking along the line VI—VI of FIG. 5; FIG. 7 is a fragmentary plan view of the FIGS. 5 and 6 embodiment; and FIG. 8 is a rear elevation view of a modified form of first hopper used in connection with the FIGS. 5 and 6 embodiment.

DESCRIPTION OF PREFERRED EMBODIMENTS

Figure 1:
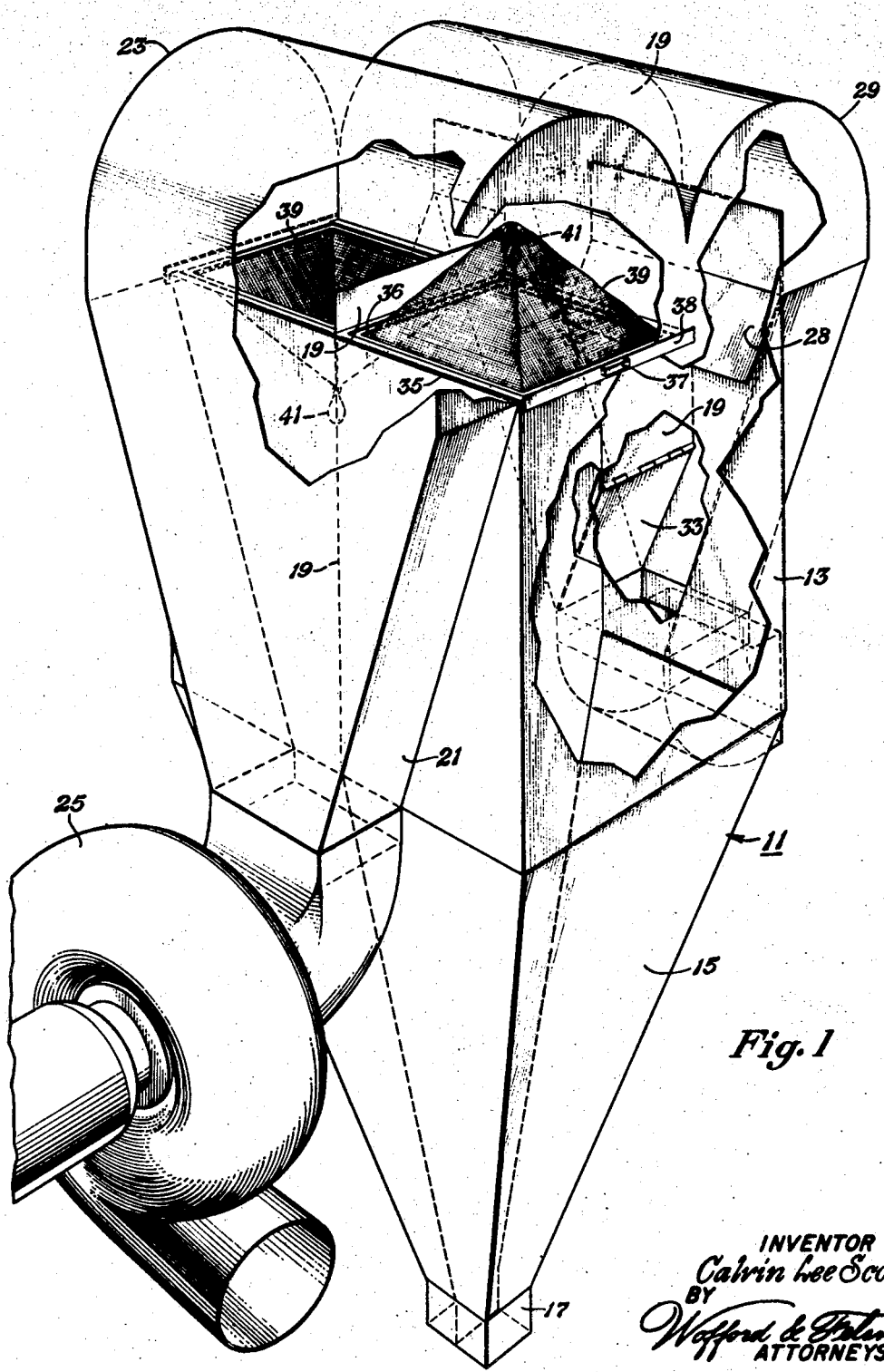
FIG. 1 is a perspective view illustrating a dust separator constructed in accordance with the principles of my invention.

The numeral 11 in the drawing designates a first hopper which includes an upper generally cubic portion 13 and a lower polyhedron 15 having truncated lower region 17 forming an outlet for accumulated dust particles. The hopper 11 is partitioned with a generally vertical wall 19 extending from the top of the hopper to the truncated lower portion 17.

An outlet conduit 21, having an arcuate upper region 23 extending partially across the top of the hopper, supports a fan 25 which communicates pneumatically with the two separate compartments A, B (see FIG. 4) formed by vertical wall 19 and hopper 11.

An inlet conduit 27 having an upper arcuate region 29 is connected with an upper region of a respective compartment and divided into two separate flow passages C and D by a partition which in this instance is an extension of previously described vertical wall 19, so the air flow is directed downward by arcuate region 29. A baffle plate 28 may be used to deflect air toward an upper portion of the hopper and the outlet conduit 21.

A valve 31, which here consists of a rectangular metal sheet 33 supported by a hinge 34 on a lower region of the vertical wall 19 in the inlet conduit 27, selectively and alternately causes air flow through one and then the other of the separate passages C or D and through the connecting separate compartments A or B in the hopper.

Filter support means 35, here in the form of horizontally slotted slide holders, receive in each compartment a metal frame 36 having a handle 37 exposed on an exterior plate 38 for convenient removal of flexible filter 39. Each filter 39 has an area which exceeds the area defined by the metal frame 36 to assume a triangular cross sectional form, and consequently will assume an upwardly or downwardly extending position as shown in FIG. 1. Weighting elements 41 are secured to the approximate mid-region of each flexible filter 39, each of which has a weight selected to enable the filter 39 to assume an upwardly extending position as shown in FIG. 1, but heavy enough to forcefuly urge the filter means downward with a popping jolt to dislodge dust particles.

In operation of the apparatus shown in FIGS. 1 through 4, the fan means 25 is energized to cause air flow through the inlet conduit 27, through separate passages C and D (depending upon the position of the valve means 31); through separate compartments A or B in the hopper; and through the outlet conduit 21.

Figures 2, 3, 4:
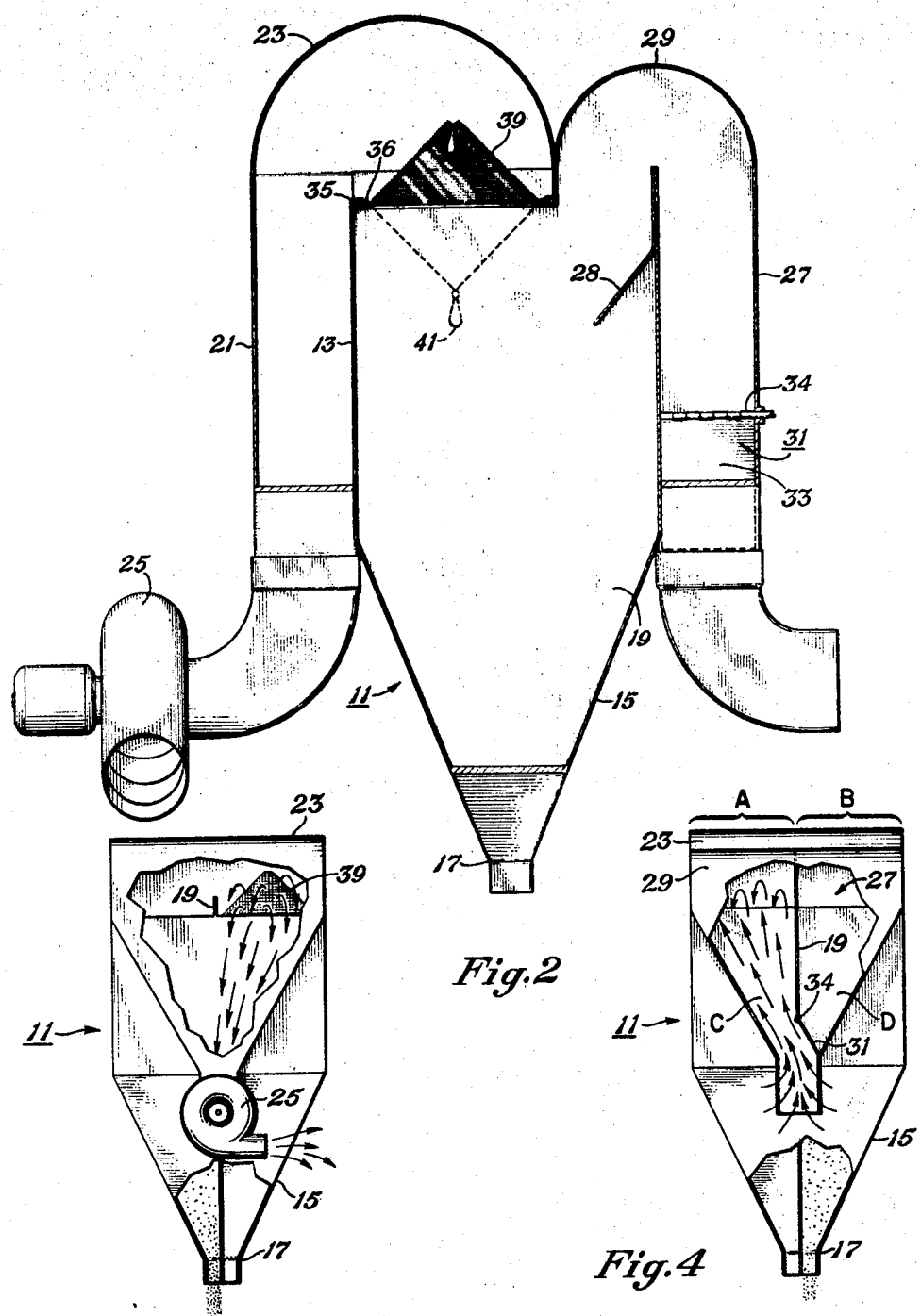
FIG. 2 is a side elevation view in longitudinal section.
FIG. 3 is a front elevation view with fragments broken away to show interior construction.
FIG. 4 is a rear elevation view with portions broken away to show interior construction.

After the valve means 31 is initially positioned as shown in FIG. 4, the resulting flow through separate passage C, through compartment A and through the associated filter 39 to extend it as shown in FIG. 1, accumulates particles of dust on the filter 39 which gradually increases the pressure differential across the filter and increases the load on the fan 25. To cleanse this filter, the valve means 31 is positioned to stop flow through separate passage C and compartment A, while directing the flow through separate passage D and compartment B. Consequently, the filter associated with the compartment A, is forcefully urged downward by the weighting means 41 to jolt the filter with a popping action to cleanse it. Simultaneously, air is urged through the filter means associated with compartment B to begin to accumulate dust. The valve means 31 is positioned alternately to urge the flow through first one filter and then the other to alternately cleanse them.

In a dust separator apparatus of the type shown above, the fan 25 may be supported by the inlet conduit 27 to act as a blower. Moreover, the valve means 31 may be moved automatically as well as manually to alternately direct the flow across the filters. One such automatic system would operate on a simple timer and solenoid to position and reposition the valve means. Another automatic system would measure the pressure differential across each compartment and its associated outlet conduit to energize a circuit and a solenoid to alternate the valve position when the pressure differential exceeded a selected value after the active filter accumulated a significant quantity of dust particles.

In FIG. 5 a second hopper 43 is connected by separate outlet conduits 45 and 46 with separate passages C and D of the first hopper. The outlet conduits 45, 46 and the hopper 43 are separated into separate compartments E and F (see FIG. 6) that communicate respectively with passages C and D (see FIG. 8) of the inlet conduit 27. Screen means 47 extend between the outlet conduits 45, 46 and an inlet conduit 49. A valve means 51, which here operates between the outlet conduits 45, 46 (but which may be positioned elsewhere) alternately directs the flow of air into the separate flow passages and compartments. A flexible hose 53 is included as a portion of the inlet conduit 49 to simplify the entrainment of grain or other particulated solids.

In operations of the FIG. 5 apparatus, activation of fan 25 causes air flow through the flexible hose 53 of inlet conduit 49 and through a selected separate compartment E or F and one screen means 47 toward compartment A or B (which may be formed like those described in connection with FIGS. 1 through 4) in the first hopper 11. The flow through the separate passages and screens is alternated through positioning of valve 51. Relatively large solid particles accumulate on the screen means 47 while air is flowing therethrough, but fall to the bottom of hopper 43 when the flow is ceased. A control valve 55 may be selectively opened to discharge the solid particles from the hopper 43. As a consequence, relatively large solid particles are collected through the second hopper 43 and small "dust particles" through the first hopper 11.

While I have shown my invention in only a few of its forms it should be apparent to those skilled in the art that it is not so limited but is susceptible to various changes and modifications without departing from the spirit thereof.

I claim:

1. A dust separator system comprising:
   a hopper having a lower region partitioned generally vertically into two separate compartments, and an upper, unpartitioned region;
   two separate inlet flow passages, a respective one of which is connected with an upper region of one of the compartments in the hopper and directed downwardly;
   a filter support secured in each compartment in the hopper;
   a flexible air previous and dust impervious frame mounted filter removably secured to each filter support through an opening in the hopper;
   weighting elements secured to approximate mid-regions of each flexible filter;
   fan means connected with the hopper and communicating pneumatically with the two separate inlet flow passages;
   valve means supported by the hopper and having two positions to close alternately one and then the other of the separate inlet passages to intermittently interrupt air flow through each flexible filter.

2. The system defined by claim 1 further adapted for large particle separation, said system comprising:
   a generally vertically partitioned second hopper having a separate inlet conduit, and two outlet conduits connected respectively with said separate inlet flow passages of the first hopper; and
   screen means secured in each partitioned area of the second hopper.

3. A dust separator system comprising:
   a hopper having a lower region partitioned generally vertically into two separate compartments, and an upper, unpartitioned region;
   separate inlet flow passages connected respectively with an upper region of said compartments in the hopper and directed downwardly;
   a generally horizontal filter support secured in each compartment in the hopper;
   a flexible air pervious and dust impervious frame mounted filter slidably and removably secured to each filter support through an opening in the hopper, said filter having a triangular cross sectional configuration defining an apex in the approximate mid-region thereof;
   weighting elements secured to the apex of each flexible filter;
   fan means connected with the hopper and communicating pneumatically with the separate flow passages;
   valve means supported by the hopper to close alternately one and then to the other of the separate passages to intermittently interrupt air flow through each flexible filter.

4. The system defined by claim 3 further adapted for large particle separation, said system comprising:
   a generally vertically partitioned second hopper having a separate inlet conduit, and two outlet conduits connected respectively with said separate passage of the first hopper; and
   screen means secured in each partitioned area of the second hopper.

5. A dust separator system comprising:
   a housing having a lower region partitioned generally vertically into two separate compartments having downwardly directed inlet passages, and an upper, unpartitioned region defining an outlet passage;
   a filter support secured in each compartment;
   a flexible air pervious and dust impervious filter secured to each filter support, said filter having a triangular cross sectional configuration defining an apex in the approximate mid-region thereof;
   weighting elements secured to approximate mid-regions of each flexible filter;
   fan means connected with the housing and communicating pneumatically with the two separate compartments;

valve means communicating pneumatically with selected said passages to close alternately one and then the other of said selected passages to intermittently interrupt air flow through each flexible filter.

6. The system defined by claim 5 further adapted for large particle separation, said system comprising:

a generally vertically partitioned second housing having a separate inlet conduit, and two outlet conduits connected respectively with said separate passages of the first said housing; and screen means secured in each partitioned area of the second housing.

References Cited

UNITED STATES PATENTS

| 412,388 | 10/1889 | Hungerford | 302—59 |
|---|---|---|---|
| 2,836,256 | 11/1955 | Caskey | 55—293 |
| 571,473 | 11/1896 | Elliott | 302—28 |
| 2,648,441 | 8/1953 | Soldan | 209—403 X |
| 3,304,783 | 2/1967 | Quigley | 55—485 X |
| 3,332,218 | 7/1967 | O'Dell | 55—303 |
| 3,383,841 | 5/1968 | Oslon | 55—481 X |

FOREIGN PATENTS

| 19,517 | 3/1929 | Netherlands. |
| 24,917 | 11/1951 | Finland. |
| 282,849 | 12/1927 | Great Britain. |
| 704,206 | 2/1931 | France. |
| 934,283 | 8/1963 | Great Britain. |

HARRY B. THORNTON, Primary Examiner

ROBERT HALPER, Assistant Examiner

U.S. Cl. X.R.

55—293; 209—250, 379